United States Patent
Edala et al.

(10) Patent No.: US 8,478,749 B2
(45) Date of Patent: Jul. 2, 2013

(54) METHOD AND APPARATUS FOR DETERMINING RELEVANT SEARCH RESULTS USING A MATRIX FRAMEWORK

(75) Inventors: Narasimha Edala, New Albany, OH (US); Donald Loritz, Springboro, OH (US); David James Miller, Dayton, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 832 days.

(21) Appl. No.: 12/506,075

(22) Filed: Jul. 20, 2009

(65) Prior Publication Data

US 2011/0016118 A1    Jan. 20, 2011

(51) Int. Cl.
*G06F 7/00*    (2006.01)
*G06F 17/30*    (2006.01)

(52) U.S. Cl.
USPC .......................................... 707/723; 707/730

(58) Field of Classification Search
USPC ................... 707/739, 741, 999.003, 999.005, 707/723
See application file for complete search history.

(56) References Cited

U.S. PATENT DOCUMENTS

| | | | |
|---|---|---|---|
| 6,847,966 B1 * | 1/2005 | Sommer et al. | 707/739 |
| 6,968,335 B2 | 11/2005 | Bayliss et al. | |
| 7,483,892 B1 * | 1/2009 | Sommer et al. | 1/1 |
| 2002/0138478 A1 * | 9/2002 | Schwartz et al. | 707/3 |
| 2004/0220944 A1 * | 11/2004 | Behrens et al. | 707/100 |
| 2006/0224572 A1 * | 10/2006 | Price | 707/3 |
| 2006/0235661 A1 * | 10/2006 | Price | 703/2 |
| 2007/0067281 A1 * | 3/2007 | Matveeva et al. | 707/5 |
| 2008/0104063 A1 * | 5/2008 | Gallivan et al. | 707/5 |
| 2009/0125498 A1 * | 5/2009 | Cao et al. | 707/5 |
| 2009/0276421 A1 * | 11/2009 | Qiu | 707/5 |
| 2011/0258196 A1 * | 10/2011 | Lepsoy et al. | 707/741 |

\* cited by examiner

*Primary Examiner* — Jacob F Bétit
*Assistant Examiner* — Bao Tran
(74) *Attorney, Agent, or Firm* — Dinsmore & Shohl LLP

(57) ABSTRACT

A method and apparatus are provided for ranking documents according to relevancy scoring. In one implementation, a computer-implemented method is provided for receiving search results identifying a plurality of documents resulting from a search, the plurality of documents containing one or more words. The method generates a first matrix containing a term column and a document column, wherein at least one row of the first matrix correlates one of the plurality of documents with one of the terms. The method selects a sort preference, and sorts the two-column matrix according to the sort preference. The method further generates a second matrix containing values representing a measure of overlap between the plurality of documents and the terms. The method further calculates cumulative confidence scores according to the values of the second matrix and ranks the search results according to the cumulative confidence scores.

21 Claims, 6 Drawing Sheets

| TermxDocument | Document D1 |
|---|---|
| Brown | 1 |
| Fox | 2 |
| Jumped | 1 |
| Over | 1 |
| Black | 1 |

The number of times a word appears in a document

FIG. 3

| TermxDocument | D1 | D2 |
|---|---|---|
| brown | 1 | 0 |
| fox | 2 | 1 |
| jumped | 1 | 0 |
| over | 1 | 1 |
| black | 0 | 1 |
| ran | 0 | 1 |
| for | 0 | 1 |
| shelter | 0 | 1 |

| D1 | T1 |
|----|----|
| D1 | T3 |
| D1 | T7 |
| ... | ... |
| D2 | T2 |
| D2 | T3 |
| ... | ... |
| D3 | T2 |
| D3 | T7 |
| ... | ... |

FIG. 6

| D1 | T1 | |
|----|----|---|
| D2 | T2 | Increment value at (2,3) and (3,2) |
| D3 | T3 | |
| D1 | T2 | Increment value at (1,2) and (2,1) |
| D2 | T3 | |
| ... | ... | |
| D1 | T7 | Increment value at (1,3) and (3,1) |
| D3 | T7 | |
| ... | ... | |

FIG. 7

| D1 | T1 | |
|----|----|---|
| D2 | T2 | Increment value at (2,3) and (3,2) |
| D3 | T3 | |
| D1 | T2 | Increment value at (1,2) and (2,1) |
| D2 | T3 | |
| ... | ... | |
| D1 | T7 | Increment value at (1,3) and (3,1) |
| D3 | T7 | |
| ... | ... | |

$$= \begin{bmatrix} 0 & + & + & 0 \\ + & 0 & + & + \\ + & + & 0 & 0 \\ 0 & 0 & 0 & 0 \end{bmatrix}$$

|  | D1 | D2 | D3 | D4 |
|---|---|---|---|---|
| Brown | 5 | 0 | 0 | 2 |
| Fox | 0 | 1 | 3 | 5 |
| Red | 0 | 0 | 2 | 4 |
| Tree | 6 | 4 | 0 | 0 |
| Ran | 0 | 7 | 0 | 0 |
| Over | 1 | 5 | 4 | 0 |
| Black | 0 | 3 | 0 | 5 |

| D1 | Brown |
|---|---|
| D1 | Tree |
| D1 | Over |
| D2 | Fox |
| D2 | Tree |
| D2 | Ran |
| D2 | Over |
| D2 | Black |
| D3 | Fox |
| D3 | Red |
| D3 | Over |
| D4 | Brown |
| D4 | Fox |
| D4 | Red |
| D4 | Black |

| D2 | Black |
|---|---|
| D4 | Black |
| D1 | Brown |
| D4 | Brown |
| D2 | Fox |
| D3 | Fox |
| D4 | Fox |
| D1 | Over |
| D2 | Over |
| D3 | Over |
| D2 | Ran |
| D3 | Red |
| D4 | Red |
| D1 | Tree |
| D2 | Tree |

FIG. 10

|    | D1      | D2        | D3  | D4      |
|----|---------|-----------|-----|---------|
| D1 | 1+1+1   | 1+1       | 1   | 1       |
| D2 | 1+1     | 1+1+1+1+1 | 1+1 | 1+1     |
| D3 | 1       | 1+1       | 1+1+1 | 1+1   |
| D4 | 1       | 1+1       | 1+1 | 1+1+1+1 |

FIG. 11

|    | D1 | D2 | D3 | D4 |
|----|----|----|----|----|
| D1 | 3  | 2  | 1  | 1  |
| D2 | 2  | 5  | 2  | 2  |
| D3 | 1  | 2  | 3  | 2  |
| D4 | 1  | 2  | 2  | 4  |

FIG. 12

|    | D1    | D2    | D3    | D4    |
|----|-------|-------|-------|-------|
| D1 | (3+3) | (3+5) | (3+3) | (3+4) |
| D2 | (5+3) | (5+5) | (5+3) | (5+4) |
| D3 | (3+3) | (3+5) | (3+3) | (3+4) |
| D4 | (4+3) | (4+5) | (4+3) | (4+4) |

FIG. 13

|    | D1        | D2        | D3        | D4        |
|----|-----------|-----------|-----------|-----------|
| D1 | 3/(3+3-3) | 2/(3+5-2) | 1/(3+3-1) | 1/(3+4-1) |
| D2 | 2/(5+3-2) | 5/(5+5-5) | 2/(5+3-2) | 2/(5+4-2) |
| D3 | 1/(3+3-1) | 2/(3+5-2) | 3/(3+3-3) | 2/(3+4-2) |
| D4 | 1/(4+3-1) | 2/(4+5-2) | 2/(4+3-2) | 4/(4=4-4) |

FIG. 14

|    | D1       | D2       | D3       | D4       |
|----|----------|----------|----------|----------|
| D1 | 1        | 0.333333 | 0.2      | 0.166667 |
| D2 | 0.333333 | 1        | 0.333333 | 0.285714 |
| D3 | 0.2      | 0.333333 | 1        | 0.4      |
| D4 | 0.166667 | 0.285714 | 0.4      | 1        |

$$= \begin{bmatrix} 1.7 \\ 1.952381 \\ 1.933333 \\ 1.852381 \end{bmatrix}$$

METHOD AND APPARATUS FOR DETERMINING RELEVANT SEARCH RESULTS USING A MATRIX FRAMEWORK

BACKGROUND

I. Technical Field

The present disclosure generally relates to the field of search assistance technologies, such as query-recommendation systems. More particularly, the disclosure relates to computerized systems and methods for determining the similarity between terms, phrases, or documents in order to provide relevant search results based on a query.

II. Background Information

The advent of the Internet has resulted in collections of networked computer systems through which users can access vast amounts of information. The information accessible through the Internet is stored in electronic files (e.g., documents) under control of the computer systems. With advancements of storage capacity technology, the amount of information stored on each computer system has dramatically increased. Due to this increasing volume of information as well as the sheer number of documents being stored on computer systems, it is becoming more difficult than ever to locate information that is relevant to a particular subject.

To assist users in locating documents that are relevant to a particular subject, the user may conduct a search using an information retrieval system that is typically referred to as a search engine. Search engines attempt to locate and index as many of the documents provided by as many computer systems of the Internet as possible. In the past, search engines would typically perform a Boolean search based on terms entered by a user, and return any document containing all of the terms entered by the user without regard to any relevancy ranking of the search results.

More recently, some search engines have permitted users to perform a search and to filter the results according to algorithms that implement a ranking system, where the ranking assists a user in identifying relevant documents. Query-recommendation systems and filtering, navigational and visualization technologies such as de-duplication, classified displays, and clustered displays have also been provided to assist users in finding and identifying relevant documents pertaining to their search terms. Clustering technologies, for example, present users with search results that are organized in clusters. The user can then select clusters deemed relevant to a search, thus significantly reducing the amount of information for a user to sort through.

Search engines that are based on Salton's Vector Space Model implement another method to filter search results. The Vector Space Model represents documents as essentially a "bag of words" and creates a histogram, or vector, of terms plotted by frequency of occurrence, with no particular attention given to the order of the terms. In matrix notation, the document is a vector containing primitive data types such as strings or numbers representing term-frequency counts, and the document collection is a TxD (term-document matrix). Relevancy scores can be computed by performing matrix multiplication operations on the TxD matrix, and the search engine can then rank documents based on these relevancy scores.

However, performing matrix operations for similarity, especially on large document collections, can be computationally expensive. The computational complexity of multiplication over a m×n TxD matrix is $mn^2$. For example, for a document collection containing 1,000 documents and 5,000 unique terms, the computational complexity immediately runs to the order of $10^9$. At this scale, the computational time for matrix operations can extend to minutes or hours, even on modern super-computers.

Accordingly, vector space search engines suffer from drawbacks that limit their efficiency and usefulness. Therefore, there is a need for improved search systems and methods for determining relevancy of documents which can yield results in a more efficient manner.

SUMMARY

In one disclosed embodiment, a computer-implemented method determines relevant search results. The method may include receiving search results identifying a plurality of documents resulting from a search, the plurality of documents containing one or more terms. The method may also include generating a first matrix containing a term column representing the one or more terms and a document column representing the documents, wherein at least one row of the first matrix correlates one of the plurality of documents with one of the terms. The method may further include selecting the document column of the first matrix or the term column of the first matrix as a sort preference. The method may further include sorting the first matrix according to the sort preference. The method may further include generating a second matrix containing values representing a measure of overlap between the plurality of documents and the terms, based on the sorted first matrix. The method may further include calculating cumulative confidence scores according to the values of the second matrix and ranking the search results according to the cumulative confidence scores.

In another disclosed embodiment, a computer-readable medium that stores program instructions implements the above-described method.

In yet another disclosed embodiment, an apparatus determines relevant search results. The apparatus may include a memory device storing instructions for determining relevant search results, and a processor executing the instructions. The instructions, when executed by the processor of the apparatus, may instruct the apparatus to perform a series of steps. The steps may include receiving search results identifying a plurality of documents resulting from a search, the plurality of documents containing one or more terms. The steps may also include generating a first matrix containing a term column representing the one or more terms and a document column representing the documents, wherein at least one row of the first matrix correlates one of the plurality of documents with one of the terms. The steps may further include selecting the document column of the first matrix or the term column of the first matrix as a sort preference. The steps may further include sorting the first matrix according to the sort preference. The steps may further include generating a second matrix containing values representing a measure of overlap between the plurality of documents and the terms, based on the sorted first matrix. The steps may further include calculating cumulative confidence scores according to the values of the second matrix and ranking the search results according to the cumulative confidence scores.

In yet another disclosed embodiment, a computer-implemented method provides relevant documents to a client computer. The method may include sending, to a remote computer system via a network, a search query containing query terms. The method may also include obtaining, at the remote computer system, documents resulting from performing the search query on a document database. The method may further include generating a first matrix representing a measure of overlap of terms among the documents. The method may further include generating a second matrix representing a logical union of terms among the documents. The method may further include generating a third matrix, the coefficients of the third matrix being calculated based on the coefficients of the first matrix and the coefficient of the second matrix. The method may further include calculating cumulative confidence scores by summing rows of the third matrix. The method may further include ranking the search results in an order according to the cumulative confidence scores.

It is to be understood that both the foregoing general description and the following detailed description are exemplary and explanatory only and are not restrictive of embodiments, as claimed.

BRIEF DESCRIPTION OF THE DRAWINGS

The accompanying drawings, which are incorporated in and constitute a part of this disclosure, illustrate various embodiments. In the drawings:

FIG. 3 is a vector of term-frequency counts for an exemplary document.

FIG. 4 is a Term-Document matrix for an exemplary set of documents.

FIG. 5 is an unsorted two-column matrix resulting from structuring a Term-Document matrix into a two column format.

FIG. 6 is a sorted two-column matrix sorted first on terms and second on documents.

FIG. 7 is a process of creating a similarity matrix used in calculating relevancy between documents.

FIG. 10 and FIG. 11 illustrate a structuring of an exemplary similarity matrix according to the exemplary Term-Document matrix of FIG. 8.

FIG. 12 illustrates an exemplary count matrix according to the exemplary Term-Document matrix of FIG. 8.

FIG. 13 and FIG. 14 illustrate normalization of the exemplary similarity matrix for determining relevancy scores of documents, according to the exemplary Term-Document matrix of FIG. 8.

DETAILED DESCRIPTION

Figure 1:
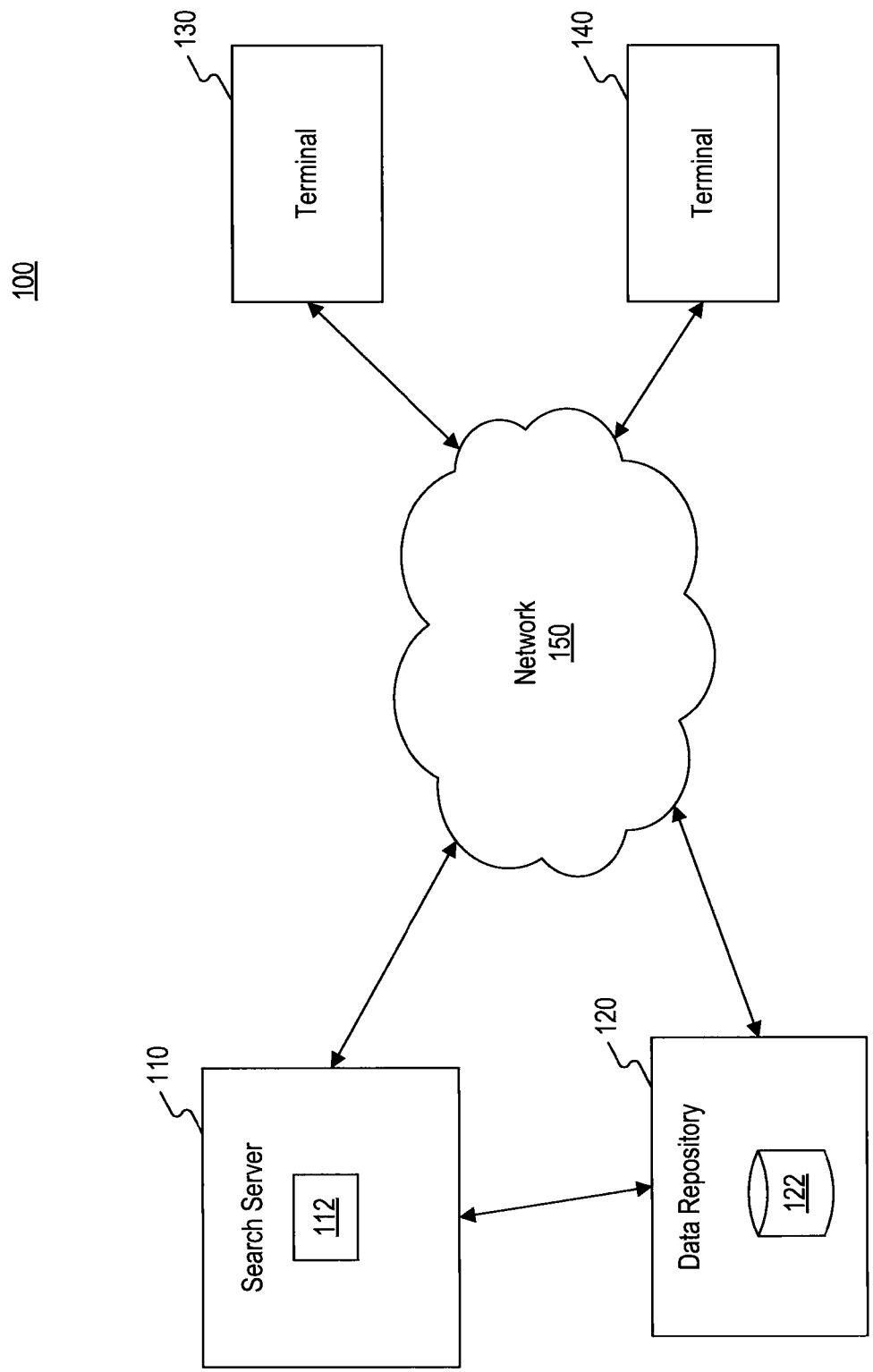
FIG. 1 is an exemplary system for implementing a search tool, consistent with a disclosed embodiment.

The following detailed description refers to the accompanying drawings. Wherever possible, the same reference numbers are used in the drawings and the following description to refer to the same or similar parts. While several exemplary embodiments are described herein, modifications, adaptations and other implementations are possible. For example, substitutions, additions or modifications may be made to the components illustrated in the drawings, and the exemplary methods described herein may be modified by substituting, reordering, or adding steps to the disclosed methods. Accordingly, the following detailed description is not limiting. Instead, the proper scope is defined by the appended claims.

FIG. 1 is an example of a system 100 that may search an index of documents stored in a data repository. As shown in system 100, search server 110, data repository 120, and terminals 130 and 140 are connected to a network 150. Although a specific numbers of servers and two terminals are depicted in FIG. 1, any number of these devices may be provided. Furthermore, the functions provided by one or more devices of system 100 may be combined. In particular, the functionality of any one or more devices of system 100 may be implemented by any appropriate computing environment.

Network 150 provides communications between the various devices in system 100, such as search server 110, data repository server 120, and terminals 130 and 140. In addition, search server 110 may access legacy systems (not shown) via network 150, or may directly access legacy systems, databases, or other network applications. Network 150 may be a shared, public, or private network, may encompass a wide area or local area, and may be implemented through any suitable combination of wired and/or wireless communication networks. Furthermore, network 150 may comprise a local area network (LAN), a wide area network (WAN), an intranet, or the Internet. Network communications may be implemented using an HTTPS (hypertext transfer protocol secure) environment, such that data transfers over the network may be done in a secure fashion.

Search server 110 may comprise a computer (e.g., a personal computer, network computer, server, or mainframe computer) having one or more processors (not shown) that may be selectively activated or reconfigured by a computer program. Furthermore, search server 110 may distribute data for parallel processing by one or more additional servers (not shown). Search server 110 may also be implemented in a distributed network. Alternatively, search server 110 may be specially constructed for carrying-out methods consistent with disclosed embodiments.

Search server 110 may include a memory 112 for storing program modules that, when executed by a processor (not shown) of the search server 110, execute one or more processes that search document indices and determine relevancy rankings for documents. Memory 112 may be one or more memory devices that store data and may also comprise, for example, one or more of RAM, ROM, magnetic storage, or optical storage.

Data repository 120 may include a database 122 that stores data records or documents for entities such as a people, businesses, buildings, websites, vehicles, etc. Although certain entities are specified herein, one of ordinary skill in the art will appreciate that embodiments may apply to any kind of entity. Furthermore, although one database is shown in FIG. 1, data repository may include more than one database. The databases included in data repository 120 may constitute a knowledge base. Furthermore, data repository 120 may receive data from search server 110, terminals 130-140, and/or other servers (not shown) available via network 150. Although shown as separate entities in FIG. 1, search server 110 and data repository server 120 may be combined. For example, search server 110 may include one or more databases in addition to or instead of data repository 120. Furthermore, search server 110 and data repository 120 may exchange data directly or via network 150.

Terminals 130-140 may be any type of device for communicating with search server 110 and/or data repository 120 over network 150. For example, terminals 130-140 may be personal computers, handheld devices, or any other appropriate computing platform or device capable of exchanging data with network 150. Terminals 130-140 may each include a processor (not shown) and a memory (not shown). Furthermore, terminals 130-140 may execute program modules that provide one or more graphical user interfaces (GUIs) on one or more types of input/output devices (not shown), such as a display monitor, keyboard, or mouse, for interacting with network resources and/or accessing search server 110. For example, one of terminals 130-140 may transmit a search query or data set (e.g., a webpage, a newspaper article, a book, etc.) to search server 110.

Figure 2:
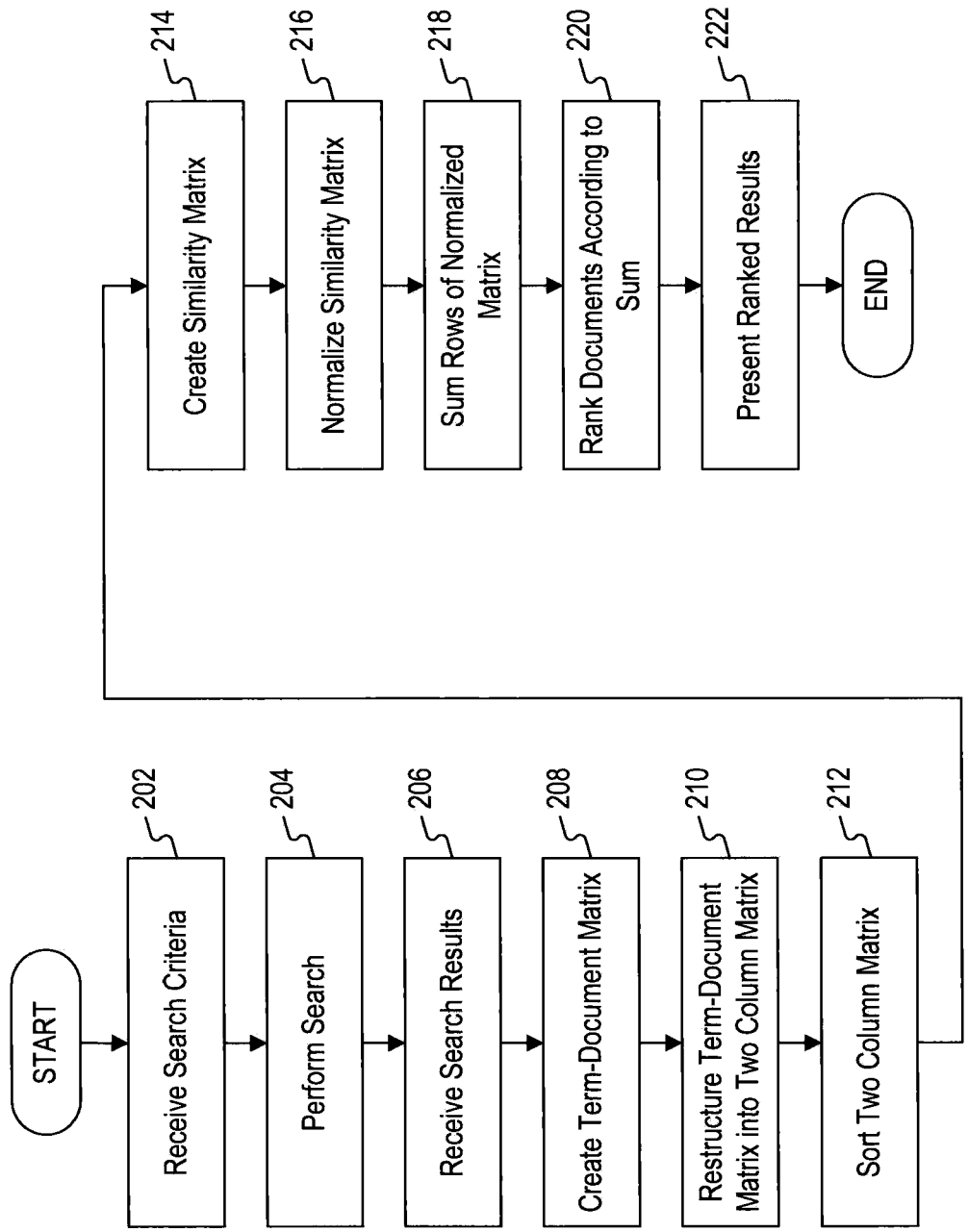
FIG. 2 is a flow diagram of an exemplary method for determining a ranking of search results based on a search criteria.

FIG. 2 is a flow diagram 200 of an exemplary method for determining and presenting relevant documents, consistent with a disclosed embodiment. The method described in connection with FIG. 2 may be implemented by, for example, program modules stored in memory 112 of search server 110.

At the start of the process, in step 202, search server 110 may receive an input search criteria. The input search criteria may be provided by receiving a user input in a GUI of terminal 130 or 140, and may include any number of words or phrases intended to express a desired search concept. Search server 110 may receive the input search criteria via network 150. Alternatively, search server 110 may receive the input search criteria from a local storage medium. For example, the input search criteria may have been read from a document (e.g., a webpage), for example, at one of terminals 130 or 140, or from a document stored in memory 112 of search server 110.

Next, in step 204, search server 110 may determine a result set of documents that is responsive to the input search criteria by performing a query of database 122 and extracting a set of results matching the input search criteria. In addition, the search server 110 may, based on a user selection, restrict the search of database 122 to particular documents. Restrictions to the search of database 122 may include, for example, limiting documents to a particular type of document (PDF, HTML, XML, etc.), author, size, date range, usage right, or originating region of the document. Furthermore, the user may specify a threshold number of results that should be returned from the search of database 122. The threshold may be set automatically or manually for a particular query, and may be set by a user of terminal 130 or 140, or an administrator of search server 110 or data repository 120. For example, a user at one of terminals 130 or 140 may increase or decrease the number of documents that search server 110 may return for the input search criteria.

In step 206, search server 110 may receive the documents extracted from database 122 as a result of the search performed in step 204. The documents may be received as a single result set containing the documents, a listing of document file names or identifiers, or as citations to the documents located in database 122 of data repository 120 by way of links embedded in an HTML, XML, or other such document.

In step 208, search server 110 may tokenize and index the documents received in step 206. Known toolkits in the art may be used to tokenize the documents into term vectors, e.g., Lucene analyzers, Lemur Toolkit, or simple Regex-based white-space tokenizers. The tokenized terms of the documents, separated into vectors of terms associated with each document, may be used to create a term-document (TxD) matrix. The TxD matrix may represent the number of occurrences of a particular term in the documents, and may be stored in memory 112 in a data-structure optimized for quick searching. An exemplary TxD matrix for a single document is shown in FIG. 3. As indicated in FIG. 3, document D1 may contain the phrase "brown fox jumped over black fox." A TxD matrix may be constructed for D1, and the matrix may contain values indicating the frequency of each word in the document. A further example is shown in FIG. 4, where a second document D2 may be introduced that may contain, for example, the phrase "black fox ran for shelter." Based on an exemplary search result returning documents D1 and D2 as results of an input search criteria, a TxD matrix is constructed associating a frequency of occurrence of words in each of the documents of the search result.

Next, in step 210, search server 110 may create an unsorted two-column matrix representing the contents of the TxD matrix. The two-column matrix may consist of a column for documents containing a document identifier, and a column for terms found in the documents. Rows of the two-column matrix may include a document identifier paired with a term found in the document indicated by the document identifier, as represented by FIG. 5. For example, FIG. 5 represents an exemplary two-column matrix constructed showing documents D1, D2, and D3, and terms T1, T2, T3, and T7. As shown in FIG. 5, document D1 contains terms T1, T3, and T7. Accordingly, the two-column matrix contains separate rows pairing document D1 with term T1, document D1 with term T3, and document D1 with term T7.

In step 212, search server 110 may perform a sort operation on the two-column matrix shown in FIG. 5. A total of two sorting operations may be performed on the two-column matrix. One aspect may involve sorting the two-column matrix first according to the term column, and second according to the documents column. This sort operation may place documents having common terms in immediate succession of one another in the matrix. FIG. 6 represents an exemplary sorted two-column matrix created by performing, on the two-column matrix of FIG. 5, a sort operation first on the terms column and second on the documents column. As shown in FIG. 6, upon performing the sort operation, documents D2 and D3 both share a common term T2, and are placed in immediate succession of one another in the sorted matrix. Similarly, documents D1 and D3 both share a common term T7. Based on this sorting, search server 110 may create a similarity matrix that is used in calculating relevancy between the documents.

The search server 110 may create the similarity matrix having m×m dimensions, where m is equal to the number of documents in the TxD matrix. The similarity matrix may be created by determining a measure of overlap, or intersection, between a first and second document, measured as a numerical value. For a first document D1 containing one or more terms, and a second document D2 containing one or more terms, the similarity matrix is D1∩D2. Once the measure of overlap between the first and second document is measured, the measure of overlap may be normalized against a matrix D1∪D2 to represent the measure of overlap in percentage terms. Finally, rows of the similarity matrix, containing the measure of overlap in percentage terms, may be summed to determine cumulative confidence scores of the documents. The above process will now be described in further detail.

For determining the measure of overlap of documents, the similarity matrix may be based on a zero matrix $0_{m \times m}$, that is, a matrix having all entries of the matrix set to zero. The similarity matrix may be incremented according to the overlap of terms in a first and second document, by incrementing by a value of "1" at positions in the matrix corresponding to the first and second documents. Furthermore, the incrementing of the similarity matrix may be performed in an extremely efficient computational manner, such as using hardware counters, increment operators in machine code, assembly language, etc. Furthermore, the similarity matrix may be incremented and stored in processor registers for efficient processing.

For exemplary purposes, using the sorted two-column matrix created in step 212, positions in the similarity matrix may then be incremented based on combinations of documents that share a common term. As shown in FIG. 7, as documents D2 and D3 both share common term T2, the similarity matrix may be incremented by a value of "1" at positions (2,3) and (3,2). Similarly, positions (1,3) and (3,1) may be incremented due to the common sharing of term T7.

Figures 8, 9A, 9B:
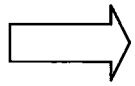
FIG. 8 is an exemplary Term-Document matrix used for illustrative purposes.
FIG. 9A is an exemplary unsorted two-column matrix resulting from structuring the exemplary Term-Document matrix of FIG. 8.
FIG. 9B is a sorted two-column matrix resulting from sorting the exemplary unsorted two-column matrix of FIG. 9A.

For illustrative purposes, FIG. 8 represents an exemplary TxD matrix indicating the frequency of occurrence of the unique terms "brown," "fox," "red," "tree," "ran," "over," and "black," distributed over a collection of 4 documents D1-D4. Using the frequency of occurrence of the terms, a relevancy order of the documents D1-D4 may be determined. As set forth above, the terms may be arranged into a two column matrix, and according to one aspect, a first sort operation may be performed according to the terms column, and a second sort operation may be performed according to the documents column. This sort operation, shown in FIG. 9, may result in placing documents near other documents that contain a common term, allowing easy determination of co-documents. As shown in FIG. 9, documents D2 and D4 may contain the term "black," while documents D2, D3, and D4 may contain the term "fox."

In step 214, and using the exemplary TxD matrix shown in FIG. 8, search server 110 may create a similarity matrix for each of the documents in the TxD matrix. As described above, the similarity matrix may be created by first generating an m×m increment matrix that is a zero matrix $0_{m \times m}$, that is, a matrix having all entries of the matrix set to zero. Incrementing of the similarity matrix may first be performed by incrementing the matrix position corresponding to each specific document, according to the number of total terms in the specific document. For example, considering a document D1, the number of terms appearing in document D1 may be summed, and position (1,1) of the similarity matrix may be incremented by the number of unique terms appearing in the document. Similarly, position (4,4) may be incremented by the number of unique terms appearing in document D4.

For exemplary purposes, as shown in FIG. 8, document D1 contains three unique terms, and therefore position (1,1) of the similarity matrix may be incremented three times (1+1+1), as shown in FIG. 10. Similarly, document D2 contains five unique terms, and therefore position (2,2) of the similarity matrix may be incremented five times (1+1+1+1+1), as shown in FIG. 10. This process may be performed for each of the positions in the similarity matrix corresponding to a single document. Once this process is performed, the additional positions of the similarity matrix may be filled, according to the measure of overlap between the documents.

As shown in FIG. 9B, document D2 and D4 each contain the common term "black," and therefore, the similarity matrix may be incremented by a value of "1" at positions (2,4) and (4,2), the positions corresponding to combinations of documents D2 and D4. Furthermore, documents D2, D3, and D4 each contain the common term "fox," and therefore, the similarity matrix may be incremented by a value of "1" at positions (2,3), (2,4), (3,2), (3,4), (4,2), and (4,3). Continuing this process for each of the terms in the sorted two-column matrix of FIG. 9B yields an similarity matrix shown in FIG. 10. By summing the "1" values in each position of the similarity matrix of FIG. 10, the similarity matrix may be created as shown in FIG. 11.

In step 216, the similarity matrix, denoted $\alpha_{m,n}$, can then be normalized to represent the measure of overlap in percentage terms by using a count matrix denoted $\beta_{m,n}$, where m and n equal the number of documents in the TxD matrix. The normalization may be performed by determining, for each position in the similarity matrix, a value according to the following equation:

$$\gamma_{m,n} = \alpha_{m,n} / (\beta_{m,n} - \alpha_{m,n}) \quad (1)$$

where $\gamma_{m,n}$ denotes a position (m,n) of the normalized similarity matrix.

The count matrix $\beta_{m,n}$ may be calculated by determining the total number of unique words found in each document represented by a specific position in the count matrix. For example, at position (2,3) of the count matrix, the value at that specific position equals (5+3), representing the total number of terms in D2 (five) added to the total number of terms in D3 (three). Similarly, at position (1,4) of the count matrix, the value at that specific position equals (3+4), due to the fact that D1 contains three unique terms, and D4 contains four unique terms. Following this process, the count matrix $\beta_{m,n}$ may be created as shown in FIG. 12.

Using the similarity matrix $\alpha_{m,n}$ and the count matrix $\beta_{m,n}$, the normalized similarity matrix $\gamma_{m,n}$ can be created based on equation (1). For example, using equation (1), the exemplary TxD matrix of FIG. 8, the similarity matrix of FIG. 11, and the count matrix of FIG. 12, position (2,1) of the normalized similarity matrix may be calculated as:

$$\gamma_{2,1} = \alpha_{2,1} / (\beta_{2,1} - \alpha_{2,1}) \quad (2)$$

and by substituting the values from the similarity matrix and count matrix:

$$\gamma_{2,1} = 2/(5+3-2) \quad (3)$$

$$\gamma_{2,1} = 0.33333333 \quad (4)$$

Following this process, the normalized similarity matrix $\gamma_{m,n}$ may be created as shown in FIG. 13.

In step 218, the rows of the normalized similarity matrix may be summed to determine a cumulative confidence score for the documents. For example, based on the exemplary documents in FIG. 8, the rows of the normalized similarity matrix may be summed as shown in FIG. 14.

In step 220, the documents may be ranked according to the summations. As shown in FIG. 14, a calculated importance of documents D1-D4 may be determined. Specifically, document D2 has the highest importance, followed by D3, D4, and D1. Furthermore, one may also determine the similarity between documents based on the normalized similarity matrix. For example, using the normalized similarity matrix shown in FIG. 14, it may be determined that document D2 is 28.5% similar to document D4, whereas document D2 is 33% similar to documents D1 and D3. Using these values, search server 110 may determine an appropriate ranking for presenting search results to a user of terminals 130-140. It is to be appreciated that such a ranking may be determined by taking the calculated importance solely, or in combination with document similarity values, as well as any other criterion for producing a final document ranking, such as, preference for a certain type of document, preference for a certain author, etc.

In step 222, the ranked results may be transmitted over network 150 to terminals 130-140, and the ranked results may be displayed and presented to a user on a GUI of terminals 130-140. Alternatively, search server 110 may store the ranked results into a document (e.g., a webpage) for transmitting and storing, or displaying, on user terminals 130-140.

Alternatively, another implementation may involve performing sort operation 212 first on documents, and second on terms. By performing a sort operation in this manner, and by performing steps 214-222 in the manner set forth above, a similarity matrix may be created that is used in calculating relevancy between unique terms in a document-collection. By performing steps 214-222, search server 110 may determine additional query suggestion terms for displaying to the user of terminals 130-140. Alternatively, search server 110 may use the additional query suggestion terms as expansion terms in a secondary search, whereby the results may be presented to the user of terminals 130-140.

While the above implementation assumes the use of term vectors for determining relevancy between documents and terms, search server 110 may perform operations on vectors containing different types of information, including information other than primitive data types such as strings or numbers. Vectors representing non-document-term information, e.g., user-query logs, user-profiles, and document-taxonomy classification, may use the established framework set forth in the above description. For example, a user profile may include information detailing specific attributes or interests representing the specific user, such as a country, city, occupation, area of specialization, age, keywords associated with the user, or any other such information pertinent to the user. Database 122 may store this information as vectors representing data associated with a specific user. By ensuring that the vectors represent data capable of being sorted and compared, search server 110 may determine a relativity measure between the data represented by the vectors.

For example, database 122 may store user profiles where each user profile is associated with various data-types, and search server 110 may extract a vector of data-types associated with a specific user. Using multiple vectors corresponding to different users, search server 110 may create the equivalent of a term-document matrix using the data-types of the user vectors to create, for example, a data-type by user (DxU) matrix. The DxU matrix may represent the number of occurrences of a particular data-type between the individual users. By performing steps 212-222 in the manner set forth above, a similarity matrix may be created that is used to calculate relevancy between user profiles, or to determine key user-profiles from user-sets. Search server 110 may provide collaborative recommendations based on relationships between users in the user-set.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, embodiments may use different types of computer-readable storage mediums, such as secondary storage devices, for example, hard disks, floppy disks, or CD-ROM, or other forms of RAM or ROM.

Computer programs based on the written description and methods of this specification are within the skill of a software developer. The various programs or program modules may be created using a variety of programming techniques. For example, program sections or program modules may be designed in or by means of Java, C++, assembly language, or any formal language that supports sorting and indexed arrays. One or more of such software sections or modules may be integrated into a computer system or existing e-mail, database, or browser software.

Moreover, while illustrative embodiments have been described herein, the scope includes any and all embodiments having equivalent elements, modifications, omissions, combinations (e.g., of aspects across various embodiments), adaptations and/or alterations based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope of equivalents.

What is claimed is:

1. A computer-implemented method of determining relevant search items, the method comprising the steps performed by a computer of:
   receiving search results identifying a plurality of documents resulting from a search, the plurality of documents containing one or more terms;
   generating a first matrix containing a term column representing the one or more terms and a document column representing the documents, wherein at least one row of the first matrix correlates one of the plurality of documents with one of the terms;
   selecting the document column of the first matrix or the term column of the first matrix as a sort preference;
   sorting the first matrix according to the sort preference;
   generating a second matrix containing values representing a measure of overlap between the plurality of documents and the terms, based on the sorted first matrix; and
   calculating cumulative confidence scores according to the values of the second matrix and ranking the search results according to the cumulative confidence scores;
   wherein the calculated cumulative confidence scores are determined by normalizing the second matrix with a third matrix, the third matrix having a plurality of element positions; and
   wherein, for each of the plurality of element positions, an element position has a value equaling the total number of unique words found in one or more of the plurality of documents corresponding to the element position.

2. The method of claim 1, wherein the terms are phrases including a plurality of words.

3. The method of claim 1, wherein the first matrix is sorted according to the term column, and then sorted according to the document column, such that documents sharing a common term are in immediate succession of one another in the sorted first matrix.

4. The method of claim 3, further comprising determining a position in the second matrix, based on the documents sharing a common term in the sorted first matrix, and incrementing a value of the second matrix at the determined position.

5. The method of claim 1, wherein the normalization of the second matrix with the third matrix calculates percentage similarities between the plurality of documents, and rows of the normalized second matrix are summed to determine the cumulative confidence scores.

6. The method of claim 1, wherein the first matrix is sorted according to the document column, and then sorted according to the term column, such that terms common to one of the plurality of documents are in immediate succession of one another in the sorted first matrix.

7. The method of claim 1, wherein the normalization results in a fourth matrix $\gamma_{m,n}$ having values calculated using the second matrix $\alpha_{m,n}$, and third matrix $\beta_{m,n}$ according to: $\gamma_{m,n} = \alpha_{m,n}/(\beta_{m,n} - \alpha_{m,n})$.

8. A non-transitory computer-readable storage medium storing instructions which, when executed by a processor, perform a method, the method comprising:
- receiving search results identifying a plurality of documents resulting from a search, the plurality of documents containing one or more terms;
- generating a first matrix containing a term column representing the one or more terms and a document column representing the documents, wherein at least one row of the first matrix correlates one of the plurality of documents with one of the terms;
- selecting the document column of the first matrix or the term column of the first matrix as a sort preference;
- sorting the first matrix according to the sort preference;
- generating a second matrix containing values representing a measure of overlap between the plurality of documents and the terms, based on the sorted first matrix; and
- calculating cumulative confidence scores according to the values of the second matrix and ranking the search results according to the cumulative confidence scores;
- wherein the calculated cumulative confidence scores are determined by normalizing the second matrix with a third matrix, the third matrix having a plurality of element positions; and
- wherein, for each of the plurality of element positions, an element position has a value equaling the total number of unique words found in one or more of the plurality of documents corresponding to the element position.

9. The computer-readable storage medium of claim 8, wherein the terms are phrases including a plurality of words.

10. The computer-readable storage medium of claim 8, wherein the first matrix is sorted according to the term column, and then sorted according to the document column, such that documents sharing a common term are in immediate succession of one another in the sorted first matrix.

11. The computer-readable storage medium of claim 10, further comprising determining a position in the second matrix, based on the documents sharing a common term in the sorted first matrix, and incrementing a value of the second matrix at the determined position.

12. The computer-readable storage medium of claim 8, wherein the normalization of the second matrix with the third matrix calculates percentage similarities between the plurality of documents, and rows of the normalized second matrix are summed to determine the cumulative confidence scores.

13. The computer-readable storage medium of claim 8, wherein the first matrix is sorted according to the document column, and then sorted according to the term column, such that terms common to one of the plurality of documents are in immediate succession of one another in the sorted first matrix.

14. The computer-readable storage medium of claim 8, wherein the normalization results in a fourth matrix $\gamma_{m,n}$ having values calculated using the second matrix $\alpha_{m,n}$ and third matrix $\beta_{m,n}$ according to: $\gamma_{m,n} = \alpha_{m,n}/(\beta_{m,n} - \alpha_{m,n})$.

15. An apparatus comprising:
- a memory device storing instructions for determining relevant search results; and
- a processor executing the instructions to perform the steps of:
- receiving search results identifying a plurality of documents resulting from a search, the plurality of documents containing one or more terms;
- generating a first matrix containing a term column representing the one or more terms and a document column representing the documents, wherein at least one row of the first matrix correlates one of the plurality of documents with one of the terms;
- selecting the document column of the first matrix or the term column of the first matrix as a sort preference;
- sorting the first matrix according to the sort preference;
- generating a second matrix containing values representing a measure of overlap between the plurality of documents and the terms, based on the sorted first matrix; and
- calculating cumulative confidence scores according to the values of the second matrix and ranking the search results according to the cumulative confidence scores;
- wherein the calculated cumulative confidence scores are determined by normalizing the second matrix with a third matrix, the third matrix having a plurality of element positions; and
- wherein, for each of the plurality of element positions, an element position has a value equaling the total number of unique words found in one or more of the plurality of documents corresponding to the element position.

16. The apparatus of claim 15, wherein the terms are phrases including a plurality of words.

17. The apparatus of claim 15, wherein the first matrix is sorted according to the term column, and then sorted according to the document column, such that documents sharing a common term are in immediate succession of one another in the sorted first matrix.

18. The apparatus of claim 17, further comprising determining a position in the second matrix, based on the documents sharing a common term in the sorted first matrix, and incrementing a value of the second matrix at the determined position.

19. The apparatus of claim 15, wherein the normalization of the second matrix with the third matrix calculates percentage similarities between the plurality of documents, and rows of the normalized second matrix are summed to determine the cumulative confidence scores.

20. The apparatus of claim 15, wherein the first matrix is sorted according to the document column, and then sorted according to the term column, such that terms common to one of the plurality of documents are in immediate succession of one another in the sorted first matrix.

21. The apparatus of claim 15, wherein the normalization results in a fourth matrix $\gamma_{m,n}$ having values calculated using the second matrix $\alpha_{m,n}$ and third matrix $\beta_{m,n}$ according to: $\gamma_{m,n} = \alpha_{m,n}/(\beta_{m,n} - \alpha_{m,n})$.

* * * * *

UNITED STATES PATENT AND TRADEMARK OFFICE
CERTIFICATE OF CORRECTION

PATENT NO. : 8,478,749 B2
APPLICATION NO. : 12/506075
DATED : July 2, 2013
INVENTOR(S) : Narasimha Edala et al.

It is certified that error appears in the above-identified patent and that said Letters Patent is hereby corrected as shown below:

In the Claims

Claim 14, column 11, line 58, change "$\gamma_{m,n}=\alpha{m,n}/(\beta_{m,n}-\alpha_{m,n})$" to "$\gamma_{m,n}=\alpha_{m,n}/(\beta_{m,n}-\alpha_{m,n})$"

Claim 21, column 12, line 57, change "$\gamma_{m,n}=\alpha_{m,n}/(\beta_{m,n}-m,n)$" to "$\gamma_{m,n}=\alpha_{m,n}/(\beta_{m,n}-\alpha_{m,n})$"

Signed and Sealed this
First Day of October, 2013

Teresa Stanek Rea
*Deputy Director of the United States Patent and Trademark Office*